Nov. 21, 1933.  I. H. KENDALL  1,936,166
METHOD OF CONNECTING PIPES AND IMPROVED PIPE CONNECTING SYSTEM
Filed July 9, 1929  3 Sheets-Sheet 2
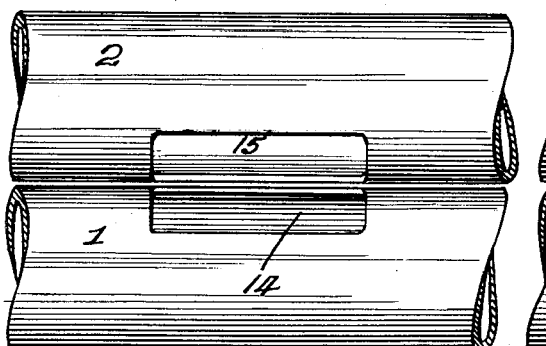
Fig. 3.
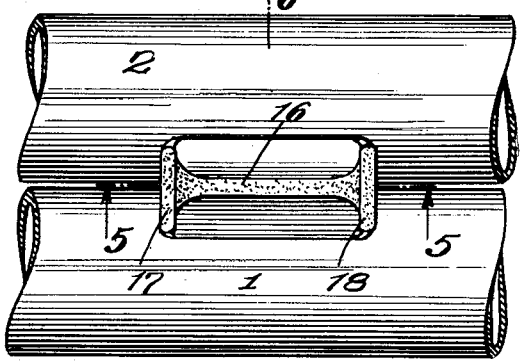
Fig. 4.
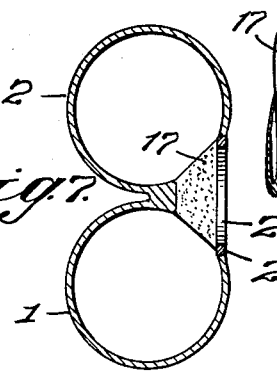
Fig. 7.
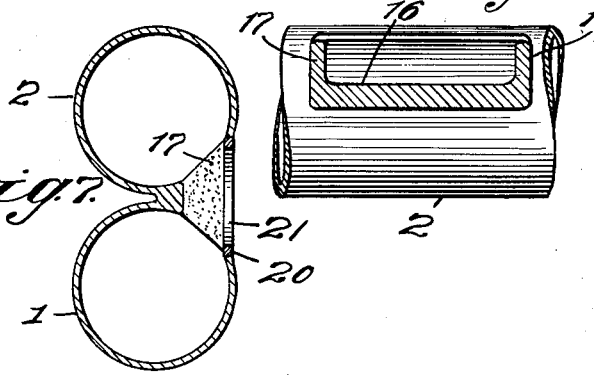
Fig. 5.
Fig. 6.
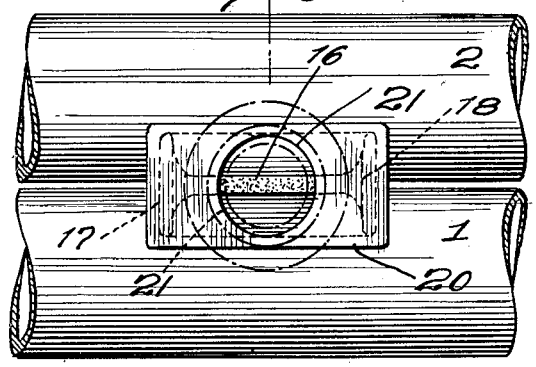
Fig. 8.
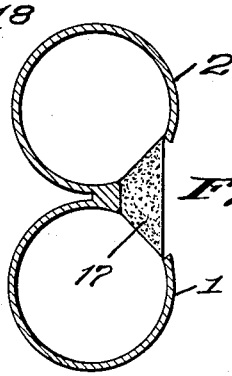
Fig. 9.
INVENTOR
Ira H. Kendall
BY
Mock & Blum
ATTORNEYS Nov. 21, 1933.        I. H. KENDALL        1,936,166
METHOD OF CONNECTING PIPES AND IMPROVED PIPE CONNECTING SYSTEM
Filed July 9, 1929        3 Sheets-Sheet 3
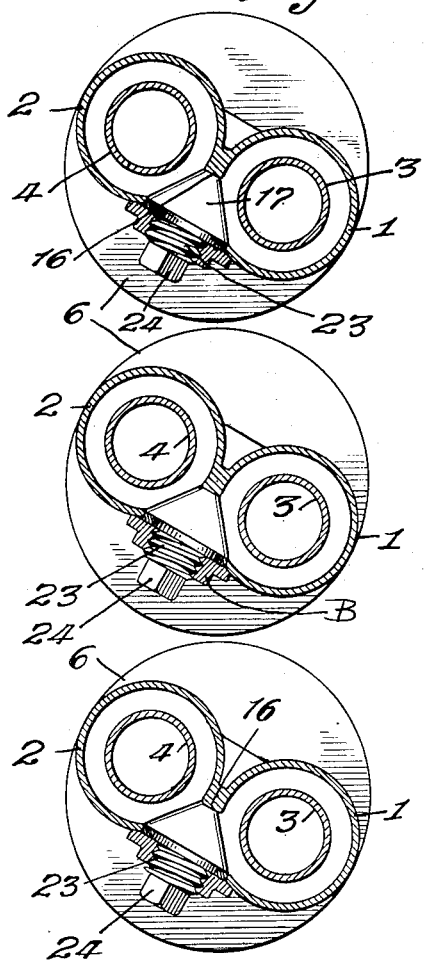
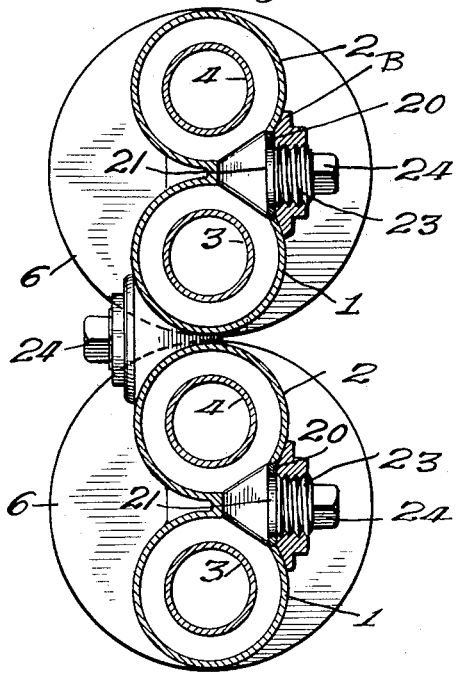
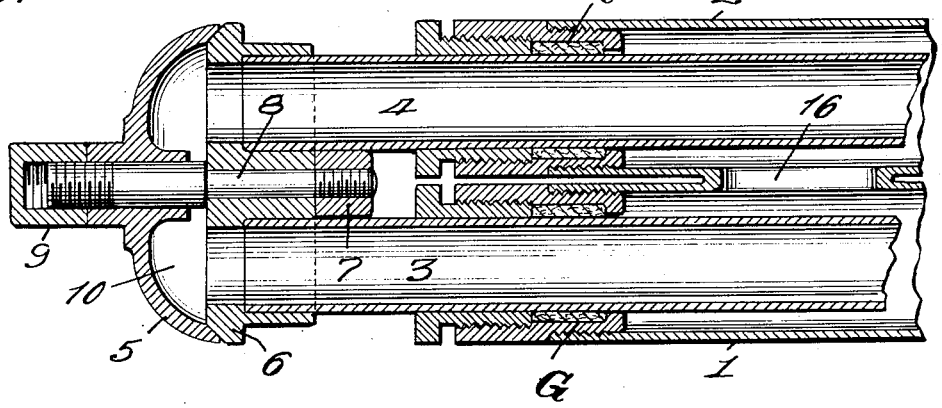
INVENTOR
Ira H. Kendall
BY
Mock & Blum
ATTORNEYS Patented Nov. 21, 1933

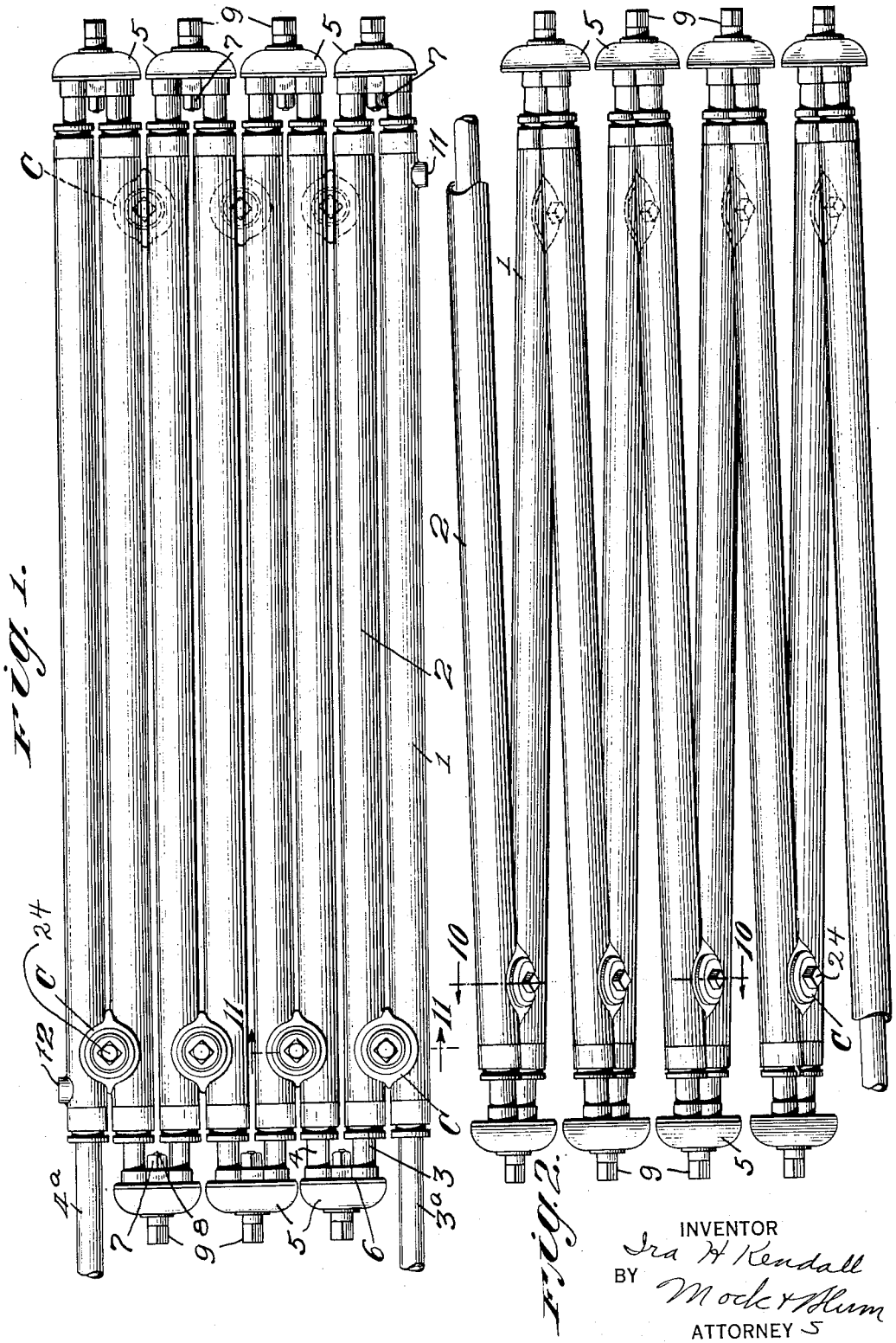

1,936,166

UNITED STATES PATENT OFFICE 1,936,166

METHOD OF CONNECTING PIPES AND IMPROVED PIPE-CONNECTING SYSTEM

Ira H. Kendall, Potsdam, N. Y., assignor to Genevieve A. Kendall, Potsdam, N. Y.

Application July 9, 1929. Serial No. 377,058

6 Claims. (Cl. 285—111)

My invention relates to a new and improved method of connecting pipes and to a new and improved pipe-connecting system.

One of the objects of my invention is to provide a method whereby pairs of pipes can be cheaply and conveniently connected for various purposes, and more particularly for use in making heaters or coolers utilized in the dairy industry for heating or cooling milk.

Another object of my invention is to provide a simple, efficient and strong pipe-connecting system which shall operate to hold a series of pipes together in connected pairs, so that the pipes will require no outer supporting frame to hold them in proper position.

Another object of my invention is to provide a series of pipes arranged in connected pairs, said pipes communicating with each other intermediate the ends thereof, so as to dispense with stuffing boxes and the like.

While I prefer to join the pipes in connected pairs for making milk heaters or coolers, my invention is not to be restricted to coupling the pipes together in connected pairs.

Another object of my invention is to provide a connection or coupling whereby the essential connection is provided by means of solidified molten metal, produced by the well-known welding arc.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a side elevation showing one embodiment of my invention.

Fig. 2 is a side elevation showing a different embodiment thereof.

Fig. 3 is a side elevation showing a pair of the pipes illustrated in Fig. 1, and also illustrating the notches and openings in the longitudinal walls of said pipes. The formation of such longitudinal openings or notches constitutes the first step in the method.

Fig. 4 is a view similar to Fig. 3 showing how the primary connection has been formed by depositing molten metal by means of a welding arc, and allowing the molten metal to solidify.

Fig. 5 is a sectional view on the line 5—5 of Fig. 4.

Fig. 6 is a sectional view on the line 6—6 of Fig. 4.

Fig. 7 is a sectional view on the line 7—7 of Fig. 8.

Fig. 8 is a detail elevation showing how the perforated face plate is connected by means of solidified molten metal which has been deposited by the welding arc.

Fig. 9 is a sectional view showing the completed coupling.

Fig. 10 is a sectional view on the line 10—10 of Fig. 2.

Fig. 11 is a sectional view on the line 11—11 of Fig. 1.

Fig. 12 is a detail central sectional view showing certain details of the connection between the inner pipes of the system.

The device shown herein can be generally utilized in the dairy industry for heating or cooling milk. If hot milk is to be cooled, then said hot milk is forced through the inner pipes of the system, while cold water or other refrigerating liquid is forced through the outer pipes of the system. If the milk is to be heated, then cold milk is forced through the inner pipes of the system and hot water or the like is forced through the outer pipes of the system.

In heating milk by an apparatus of this type, it is an important advantage to have the milk within the device freed from the heating action of the hot liquid in the outer pipes, as soon as the operation of the device is stopped. If the hot liquid continues to impart its heat to the milk located in the inner pipes, after the operation of the pump or similar device has been stopped so that the milk remains stationary in the inner pipes, then the milk has an objectionable cooked taste so that it cannot be utilized. Hence, the improved device permits the hot liquid in the outer pipes to drain automatically out of the device as soon as the operation of the device is stopped.

In the embodiment shown in Fig. 1, pairs of parallel and horizontal outer pipes 1 and 2, are provided with inner pipes 3 and 4. The bottom outer pipe and the top outer pipe are provided with nipples 11 and 12 which can be connected to a pump or other device for circulating cold or hot liquid. For example, the hot water can enter through the upper coupling or nipple 12 and the bottom nipple or coupling 11 can be connected to a tank into which the hot water in the pipes can be permitted to drain, this general idea being disclosed in my United States Patent No. 1,618,883, dated February 22, 1927.

For heating the milk, I prefer to have the cold milk enter through the top inner pipe 4a and to pass out through the bottom inner pipe 3a, while the hot water is caused to enter the top outer pipe and to pass out of the bottom outer pipe, so that cold milk and the heating liquid flow in the same direction through the system, although in the single horizontal pipe runs they travel in opposite directions. In cooling the milk, the hot milk and the cooling fluid can be caused to travel through the pipes in the same direction. However, if desired, the liquid in the outer pipes can be caused to flow in a direction opposite to that of the liquid in the inner pipes.

As shown in Fig. 12, the outer pipes 1 and 2 are arranged in pairs and these are provided with packing glands G so that the inner pipes 3 and 4 project from the ends of the said outer pipes 1 and 2, and the inner pipes 3 and 4 are also held in proper relative position.

The projecting ends of each pair of inner pipes 3 and 4 have a liquid-tight fit within a coupling head 6. This liquid-tight fit can be accomplished without the use of a packing gland by means of solder or the like. The outer wall of the coupling 6 has a frusto-conical surface which is ground so that it is very smooth, in order to have a liquid-tight fit with the correspondingly shaped and ground surface of the cap 5. The cap 5 is clamped into position by means of a bolt 7 and the nut member 9. If desired, the head of the bolt 7 could consist of a nut member.

In order to provide a firm and liquid-tight connection and coupling between the pairs of outer pipes 1 and 2, the method generally illustrated in Figs. 3–9 is utilized.

As shown in Fig. 3, each pair of outer pipes 1 and 2 is provided with corresponding slots or openings 14 and 15, each of which has a general rectangular shape. The longitudinal walls of said slots 14 and 15 are inclined toward each other, as shown in Fig. 6, so that if said longitudinal edges were prolonged, they would meet at a point outside of the respective pipes. The lateral edges of said perforations 14 and 15 are inclined away from each other as indicated for example in Fig. 4, so that said edges would meet within the respective pipes, if they were prolonged. Molten metal is deposited by a suitable welding arc to form a longitudinal connecting fin 16 along the adjacent edges of the slots 14 and 15, in order to firmly connect the same. The molten metal is also used to build up lateral tapered walls 17 and 18. It will be noted that the molten metal is so deposited while said openings 14 and 15 are laterally offset with respect to each other as shown in Fig. 4. Likewise, the molten metal is directly deposited to effect the connection, without the use of supplemental wires or rods.

An outer plate 20 of substantially rectangular form, and having a central circular opening 21 is now welded into position, by means of molten metal deposited from a welding arc, so as to complete the liquid-tight edge connection between the slots 14 and 15. The central longitudinal fin 16 firmly connects the adjacent pipes 1 and 2, and the lateral walls 17 and 18 serve as a support for the outer plate 20.

An internally threaded bushing B is now welded to the pipes by means of a layer of metal 22 which is first deposited in molten form by the electric arc and then is allowed to solidify. This bushing B can be closed by a threaded plug 23 having a polygonal head 24 which enables the plug 23 to be manipulated by a wrench.

The structure thus built up not only serves as a coupling to permit the liquid to pass between the respective outer pipes, intermediate the ends of said pipes and without the use of packing glands or the like, but it also serves to firmly connect the respective pairs of pipes.

Hence, when a structure is built up by couplings C formed as previously mentioned, it is unnecessary to support the pipes in an outer frame which was formerly necessary to keep the pipes in alignment.

As shown in Fig. 10, when the device shown in Fig. 2 is assembled, each unit which consists of a pair of outer pipes and the associated inner pipes, is so held that the communicating ports are inclined 45° to the vertical direction. In addition, the relative inclinations of the pipes shown in Fig. 2 enables the liquid to drain out more readily from both the inner pipes and the outer pipes.

In the embodiment shown in Figs. 1 and 11, the communicating ports are held vertical so that the closure plugs are held horizontal.

It is clear that when the flow of milk through the inner pipes is stopped so that the inner pipes remain full of stationary milk, that the liquid in the outer pipes can be permitted to drain out readily therefrom, thus producing a valuable economy in the dairy industry.

While I prefer to deposit the molten metal by means of a welding arc as this is a convenient and economical way of producing and manipulating the molten metal, I do not wish to be limited to this specific means for this purpose.

It will be noted that the molten metal originally connects the longitudinal slots in the pipes along three corresponding pairs of edges of said slots. However, the number of corresponding pairs of edges so connected could be varied. Likewise, in the embodiment herein described, the closure connected to the edges of the pair of slots consists of a plate 20 having a removable plug 23. While this removable plug 23 is convenient in that it permits ready access to the interiors of the pipes, it would not be departing from the invention to provide an imperforate plate 20.

While I have shown a complete system, it is obvious that many of the ideas disclosed herein could be separately utilized without incorporating all of the features of the complete system, and that generally speaking, numerous changes and omissions could be made without departing from the spirit of the invention.

It will be noted that when the face plate 20 is placed in position, that it is not absolutely necessary to deposit molten metal at its edges, although this may be done. Since the bushing B is firmly held in position by deposited molten metal, which forms a liquid-tight closure, this serves to hold the face plate 20 in position.

Likewise, while I prefer to have the face-plate 20 made separate from bushing B, it would not be departing from my invention if they were made integral.

Likewise, while I prefer to form the slots 14 and 15 intermediate the ends of the pipes, certain aspects and advantages of my invention would be retained if said openings or slots were at the ends of the pipes, so that each of said slots only had three walls.

Likewise, while I have shown the formation of lateral connecting walls 17 and 18, intermediate the lateral edges of the slots 14 and 15, by depositing molten metal, my invention is not to be limited to this specific step.

I have shown a preferred embodiment of my invention, but it is clear that numerous changes and omissions can be made without departing from its spirit.

I claim:

1. A pair of coupled pipes having corresponding openings intermediate the ends thereof, said openings having their longitudinal walls connected by a layer of deposited metal and having intermediate lateral connecting walls formed of deposited metal, a perforated face plate located at the outer ends of said lateral connecting walls, and a bushing adapted to have a plug inserted therein, said bushing being connected to the pipes.

2. A pair of coupled pipes having substantially rectangular openings in their respective walls, said openings having a single pair of aligned edges along which they are directly connected, said openings having lateral edges which are inclined to each other, said pipes being additionally connected by walls located at said lateral edges.

3. A pair of coupled pipes having substantially rectangular openings in their respective walls, said openings having a single pair of aligned edges along which they are directly connected, said openings having lateral edges which are inclined to each other, said pipes being additionally connected by walls located at said lateral edges, said walls being formed of deposited metal.

4. A pair of coupled adjacent pipes having a pair of adjacent openings, said openings having only one pair of adjacent edges, said adjacent edges being connected by a wall formed wholly of deposited metal.

5. A pair of coupled adjacent pipes having a pair of adjacent openings, said openings having only one pair of adjacent edges, said adjacent edges being connected by a wall formed wholly of deposited metal, the distance between said edges and the outer walls of said pipes being at least equal to the height of said wall, so that said wall does not project beyond the outer walls of said pipes.

6. A pair of coupled adjacent pipes having adjacent openings, said openings having a single pair of adjacent edges, said openings also having edges lateral to said adjacent edges, said adjacent edges and the corresponding lateral edges being connected by walls formed of deposited metal.

IRA H. KENDALL.